United States Patent [19]
Miller

[11] Patent Number: 6,116,471
[45] Date of Patent: Sep. 12, 2000

[54] PARTICULATE MATERIAL DISPENSING APPARATUS AND METHOD

[76] Inventor: Gary E. Miller, P.O. Box 277, Syracuse, Ind. 46567

[21] Appl. No.: 09/233,688

[22] Filed: Jan. 19, 1999

[51] Int. Cl.[7] .................................................. A45D 24/22
[52] U.S. Cl. .......................... 222/199; 222/200; 222/650; 119/53; 119/54
[58] Field of Search .................................... 222/199, 200, 222/457, 650; 119/51.12, 52.1, 52.4, 53, 53.5, 54

[56] References Cited

U.S. PATENT DOCUMENTS

| | | |
|---|---|---|
| 383,145 | 5/1888 | Pilliod . |
| 625,037 | 5/1899 | Koke . |
| 949,400 | 2/1910 | McAfee . |
| 2,309,997 | 2/1943 | Thieman .................................. 222/457 |
| 3,677,230 | 7/1972 | Braden .................................. 119/51.12 |
| 3,730,142 | 5/1973 | Kahrs et al. .............................. 119/54 |
| 3,949,909 | 4/1976 | Sterner . |
| 4,027,627 | 6/1977 | Fillion . |
| 4,297,973 | 11/1981 | Knowles . |
| 4,565,159 | 1/1986 | Sweeney . |
| 4,606,300 | 8/1986 | Sterner ..................................... 119/54 |
| 4,658,992 | 4/1987 | Peleus ..................................... 222/199 |
| 4,721,231 | 1/1988 | Richter . |
| 4,841,912 | 6/1989 | Oswald .................................... 119/53 |
| 5,069,164 | 12/1991 | Wiwi ........................................ 119/53 |
| 5,076,215 | 12/1991 | Yang . |
| 5,245,949 | 9/1993 | Hively ...................................... 119/53 |
| 5,259,337 | 11/1993 | Rasmussen . |
| 5,368,192 | 11/1994 | Ransom, II . |
| 5,463,980 | 11/1995 | Rasmussen . |

*Primary Examiner*—Andres Kashnikow
*Assistant Examiner*—Dinh Q. Nguyen
*Attorney, Agent, or Firm*—John W. Klooster

[57] ABSTRACT

Improved apparatus and method are provided for the dispensing of particulate material from the gravitationally bottom discharge mouth of a hopper. In a presently preferred form, the particulate material moves downwardly first through a conically sided zone to a toroidally-configured aperture, and, after passage therethrough, moves downwardly through a cavity that preferably has a cross-sectionally circular perimeter. Centrally upstanding in the cavity is a body with preferably conically diverging sides over which the particulate material moves downwardly to a cover plate or deck which has a circumferentially extending discharge opening through which the particulate material is discharged. Most preferably, the body also extends upwardly through the aperture and through the conically sided zone. Particulate material downward movement and discharge is produced by shaking, preferably vibration, of the deck. A presently preferred particulate material is fish feed. The apparatus and method avoid particulate material bridging and hang-up and provide the capability for achieving uniform dispensing rates generally independently of the fill level of particulate material in the hopper.

31 Claims, 4 Drawing Sheets

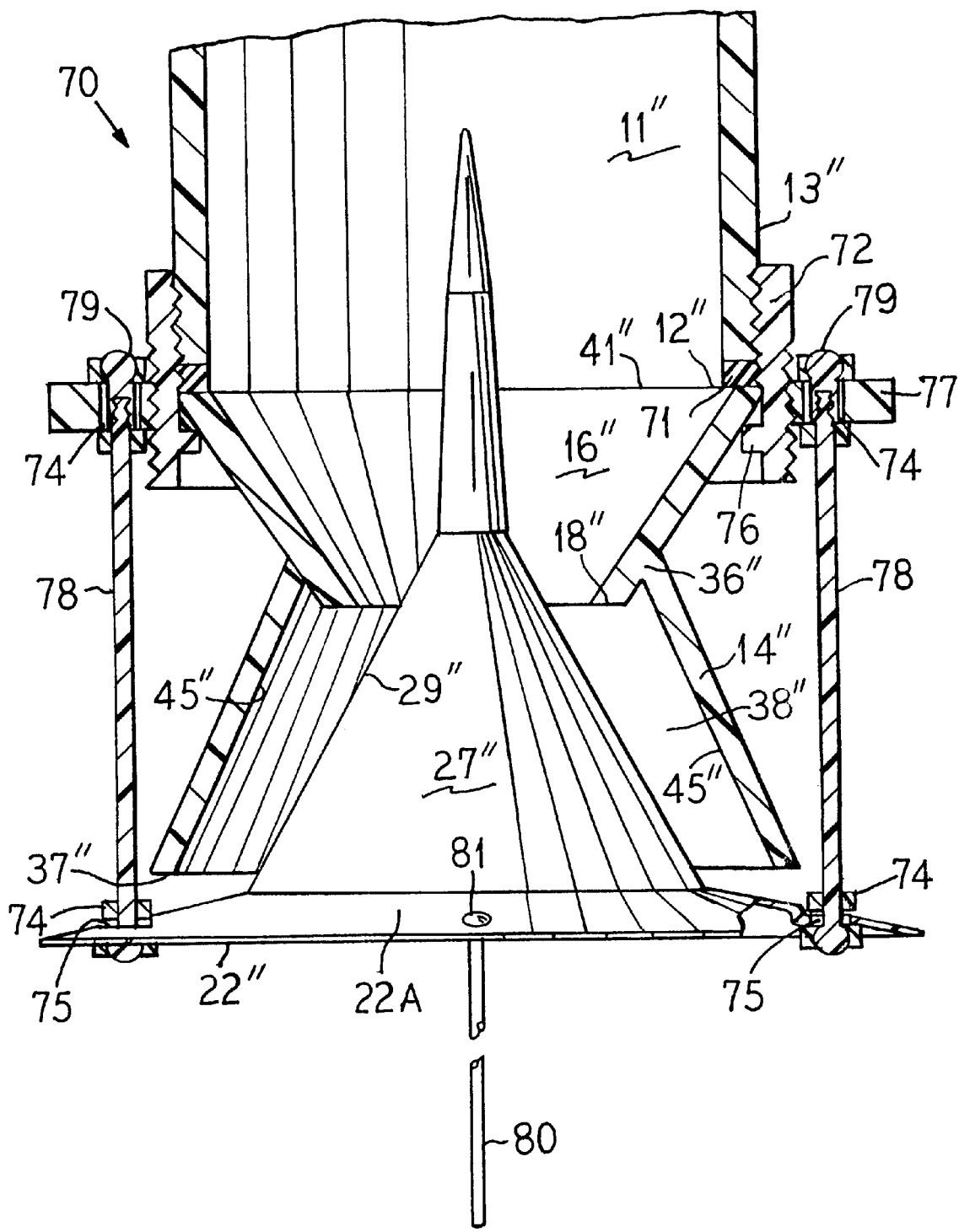

PARTICULATE MATERIAL DISPENSING APPARATUS AND METHOD

FIELD OF THE INVENTION

This invention lies in the art of apparatus and methods adapted for the dispensing of particulate material, such as fish feed, from an associated particulate material-holding reservoir or the like.

BACKGROUND OF THE INVENTION

Various applications exist where particulate material is discharged from a gravitationally bottom mouth of a holding reservoir or like vessel. There are often problems in achieving a uniform discharge of material over a desired time interval or at desired time intervals from such a mouth. Commonly, in the prior art, a discharge-facilitating device, such as a vibrator or animal actuatable wand shaking means, is associated with the mouth.

In, for example, fish feeding apparatus of the type shown in Sweeney U.S. Pat. No. 4,565,159, a hopper-like reservoir holds particulate fish feed which is discharged from a bottom mouth of the reservoir onto a water surface for consumption by fish in the water. The bottom mouth is partially closed by a cover plate so that only a small spacing is defined between the side edges of the bottom mouth and the cover plate. Elongated bolt and nut means interconnect the reservoir sides with the cover plate. A bottom central region of the cover plate is associated with an electrically actuatable vibrator means. When the vibrator means is actuated, the cover plate and the reservoir sides vibrate. The relationship between the small spacing and the vibration is adjusted so that, during vibration, fish feed is dispensed from the reservoir through the small spacing and onto the underlying adjacent water surface.

Unfortunately, the Sweeney apparatus suffers from various disadvantages. One disadvantage is that, particularly when the volume of the reservoir is relatively large and is largely filled with fish feed, there is a tendency for the fish feed to bridge and hang-up over and in the vicinity of the small spacing. Resultingly, when the cover plate vibrates, either no fish feed is dispensed, or fish feed is dispensed irregularly or non-uniformly through the small spacing.

Another disadvantages is that, even when the vibrator mean after actuation operates at a constant pattern or frequency, dispensing of fish feed from the reservoir through the small spacing can occur at different rates. The dispensing rate at a given time is related to the fill level of fish feed in the reservoir particularly when the reservoir is sufficiently large to be practical in commercial scale aquaculture. Typically, when material bridging or hang-up does not occur, the greater the height (or weight) of fish feed in the reservoir, the less the quantity of fish feed that is dispensed through the small spacing during an interval of vibration. Perhaps this result is associated with an impairment in, or a dampening of, the effective vibration due to the overbearing weight of the fish feed in the associated well-filled reservoir.

Another disadvantage is that, even though, as taught by Sweeney '159, the Sweeney '159 apparatus in a small-sized embodiment may achieve during vibration regulated dispensing of very fine feeds having a high oil content (such as may be used with small young animals), as one employs larger embodiments of Sweeney '159 apparatus, and feeds of larger particle size, such as pelletized feeds (such as may be used with relatively large animals), one loses the capacity to regulate the particular amount of feed released during individual periods of vibration.

The aquaculture of fish, particularly in high fish density culture systems, requires control of water quality, and adequate, regular and uniform fish feeding, to achieve a maximized but controlled rate of fish growth. Insufficient feeding results in slow or abnormal fish development. Excessive feeding results not only in incomplete feed consumption by the fish even when the feed is ingested by the fish, but also in water contamination problems. Irregular feeding caused by progressive or cyclical changes in feed rates, such as can occur when in operation the fish feed reservoir associated with of a Sweeney '159-type feed dispensing device is gradually emptied of feed and then is abruptly refilled, can adversely affect water quality and cause water contamination problems that are adverse to fish culture.

The above indicated Sweeney '159-type fish feeding apparatus does not provide adequate control of fish feeding, particularly under high density culture conditions, especially when using a fish feed reservoir or feeding apparatus of practical, relatively large volumetric capacity.

The art of aquaculture needs improved apparatus for dispensing fish feed which overcomes such disadvantages.

SUMMARY OF THE INVENTION

The present invention provides new and improved particulate material dispensing apparatus and method that are adapted for use in dispensing particulate materials, such as fish feeds or the like, from a gravitationally bottom discharge mouth of a functionally associated particulate material dispensing hopper, holding reservoir or the like.

In the operation of an apparatus embodiment of this invention, particulate material from such an associated reservoir bottom discharge mouth passes through the associated apparatus embodiment and is dispensed therefrom through a particulate material discharge opening. The discharge opening is defined between the lower end region of a sidewall-defining member and an adjacent, spaced, vibratable or shakable cover plate. In such an association, the sidewall-defining member preferably generally upstands and so defines the lower end region and a generally opposed upper end region.

The inventive apparatus can have various configurations, but preferably the sidewall-defining member has inside surface portions are generally cylindrically configured. The vibratable or shakable cover plate is preferably interconnected to the dispensing apparatus by any convenient means. A present preference is to interconnect the cover plate with the dispensing apparatus by a plurality of circumferentially spaced, longitudinally extending, elongated bolt and nut assemblies.

The upper end region of the sidewall-defining member is associated with a first guide member that defines therein a medial passageway having inside surface portions that downwardly taper and converge, preferably progressively and continuously, and that terminate in a central lower aperture which is preferably adapted to be, during apparatus operation, in vertically spaced, centrally positioned relationship over and above the lower end of the sidewall-defining member. This downward taper is preferably cross-sectionally circular. The configuration of the downward taper is such that, as the taper progresses towards the central lower aperture, the normally horizontal cross sectional area of the medial passageway progressively declines. A presently most preferred configuration when viewed in side elevation for these inside surface portions is conical.

The cover plate, preferably on its exposed outside, lower surface is conveniently associated with either a vibrator means or a shaking means. The vibrator means is preferably electrically energized and remotely controllable, while the shaking means is preferably a depending wand means that is animal actuatable and adapted for on-demand feeding.

The cover plate, preferably on its inside, normally upper, surface relative to the interior of the sidewall-defining member, is associated with the base of an upwardly projecting body, or second guide member. The second guide member has outside surface portions that upwardly taper and converge, preferably progressively and continuously, and that preferably terminate in a point-like configuration. The second guide member extends upwardly through the central lower aperture. This upward taper is preferably generally continuous, except perhaps in the region of the central lower aperture where the taper angle may change, and is preferably cross-sectionally circular. Also, the configuration of this taper is preferably such that, as the taper progresses upwardly, the horizontal cross-sectional area of the second guide member declines. A presently most preferred configuration when viewed in side elevation for the second guide member is conical, and most preferably this configuration resembles that of an inverted funnel where the funnel side wall inclination angle changes in the region of the central lower aperture.

The interrelationship between the downwardly tapered inside surface portions of the first guide member and the upwardly tapered outside wall portions of the second guide member is such that (a) the second guide member extends upwardly through each of the lower end and interior of the sidewall-defining member, the central lower aperture of the first guide member, and the interior of the first guide member, and (b) the upwardly tapered sidewall portions of the second guide member are about equally spaced laterally from the laterally adjacent inside surface portions of, respectively, the sidewall-defining member and the first guide member, and also from the central lower aperture of the first guide member.

Preferably, as indicated, where the second guide member outside wall surfaces are laterally opposite the central lower aperture of the first guide member, the taper angle of the second guide member changes and becomes less inclined relative to a longitudinal axis extending therethrough. Preferably the first guide member and the second guide member are generally on the same axis, that is, they are co-axial. Preferably a torroidal opening is defined between the central lower aperture of the first guide member and the adjacent outside wall portions of the second guide member.

As a consequence of such an interrelationship between the first and the second guide member components, a space or cavity is defined. This cavity exists laterally between laterally adjacent portions of the sidewall-defining member and the second guide member, and longitudinally between vertically adjacent portions of the cover plate and the bottom of the first guide member. When the inventive apparatus is connected to the bottom mouth of a primary particulate material holding reservoir or the like, this cavity serves as a transient or secondary particulate material holding reservoir, and this secondary reservoir functions in the inventive apparatus to achieve uniform dispensing of particulate material independently of the fill level of particulate material in the primary reservoir when the inventive apparatus is dispensing particulate material.

When the cover plate is vibrated or shaken, the inventive dispensing apparatus dispenses particulate material, such as, for example, fish feed, and then such particulate material passes downwardly and successively from the primary holding reservoir through the medial passageway of the first guide member, the lower aperture of the first guide member, the cavity in the second guide member, and laterally out through the small spacing or aperture defined between the lower end of the sidewall-defining member and the cover plate.

The particulate material dispensing apparatus can be connected by any convenient means to the gravitationally bottom mouth of a particulate material holding reservoir or hopper. A present preference is to so size the outside surface region of the upper end portion of the sidewall-defining member, even as such is engaged with the first guide member, that such can be slidably engaged with the bottom mouth of the holding reservoir and then mounted thereto by means of screws or the like that radially extend through the reservoir bottom end portion, through the sidewall-defining member, and into the first guide member.

The particulate material dispensing apparatus can be, if desired, constructed so as to be retrofittable to existing particulate material holding reservoirs, such as reservoirs for fish feed, or the like.

Also, if desired, the particulate material dispensing apparatus can be integrally or otherwise associated with, and/or marketed in combination with, various types of particulate material holding reservoirs, such as reservoirs for fish feed, and the like, if desired, as those skilled in the art will readily appreciate.

The inventive particulate material dispensing apparatus achieves a new and improved method of dispensing particulate material from a reservoir bottom end portion. The method involves passing the feed being dispensed successively over two tapered surfaces, such as provided by the first and the second guide members, while one of such surfaces is arranged concentrically within the other.

Particularly for a particulate material of generally uniform compositional characteristics, the inventive apparatus and method make possible the avoidance of particulate material clumping or bridging in the associated reservoir at its bottom end or mouth, permit the achievement of uniform particulate material dispensing rates at various reservoir fill levels, and make possible the regulated dispensing of particulate material from an overhead or primary hopper (or reservoir). The invention makes possible a particulate material dispensing device that can, in effect, embody a marriage between a large hopper and a small dispensing apparatus.

Surprisingly, and unexpectedly, the disadvantages associated with the above indicated type of prior art Sweeney '159 fish feeder apparatus are overcome and avoided by the particulate material dispensing apparatus provided by the present invention.

Other and further features, objects, aims, advantages, applications, embodiments and the like will be apparent to those skilled in the art from the present specification taken with the appended drawings.

BRIEF DESCRIPTION OF THE DRAWINGS

In the accompanying drawings:

FIG. 4 is a view similar to FIG. 1, but showing yet another embodiment of such apparatus.

DETAILED DESCRIPTION

Figure 1:
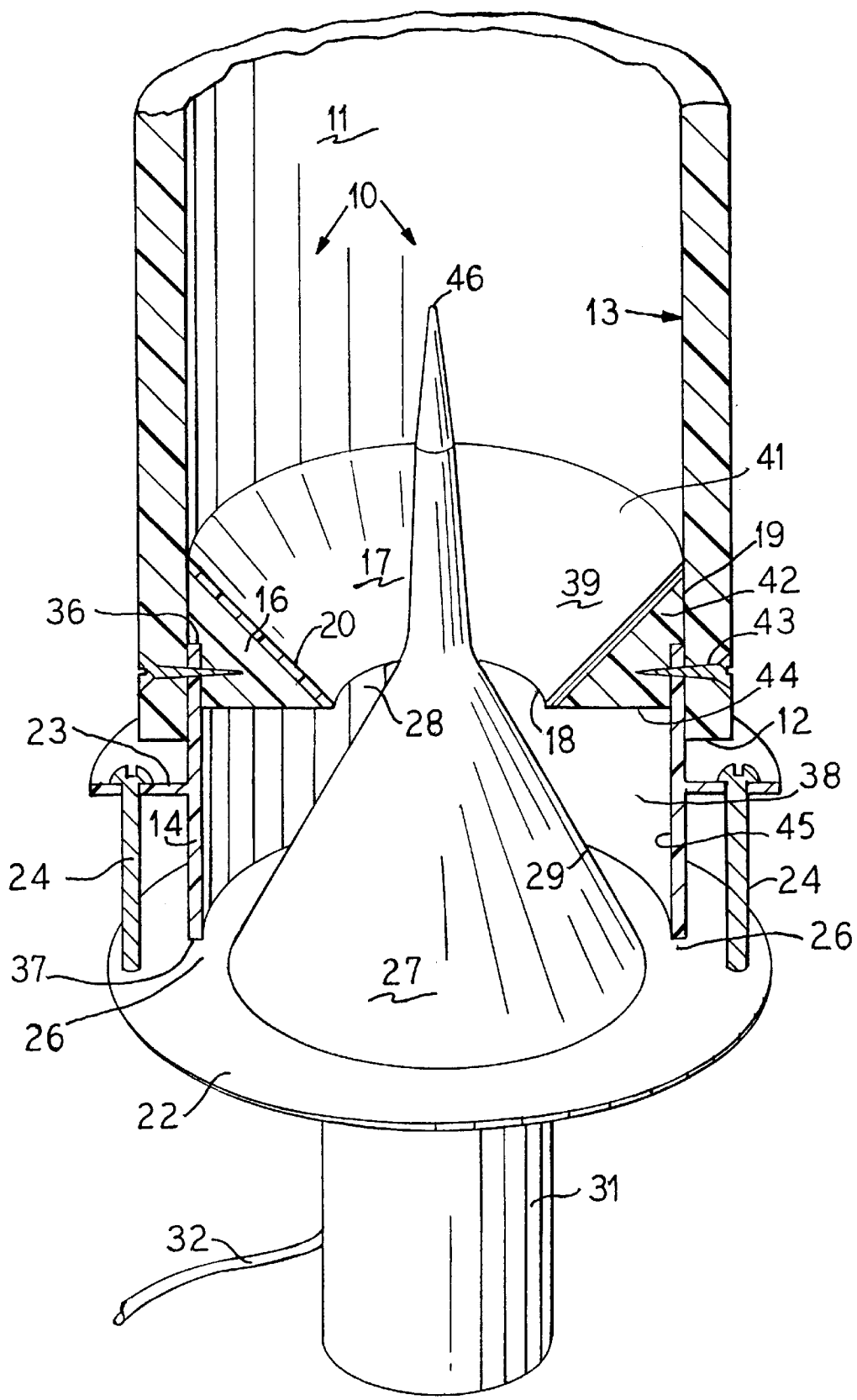
FIG. 1 is a diagrammatic, perspective view in side elevation of a presently preferred embodiment of the particulate material dispensing apparatus of the present invention, this embodiment being shown in functional association with a particulate material holding reservoir, some portions thereof being broken away, and some portions thereof being shown in vertical section.
Figure 2:
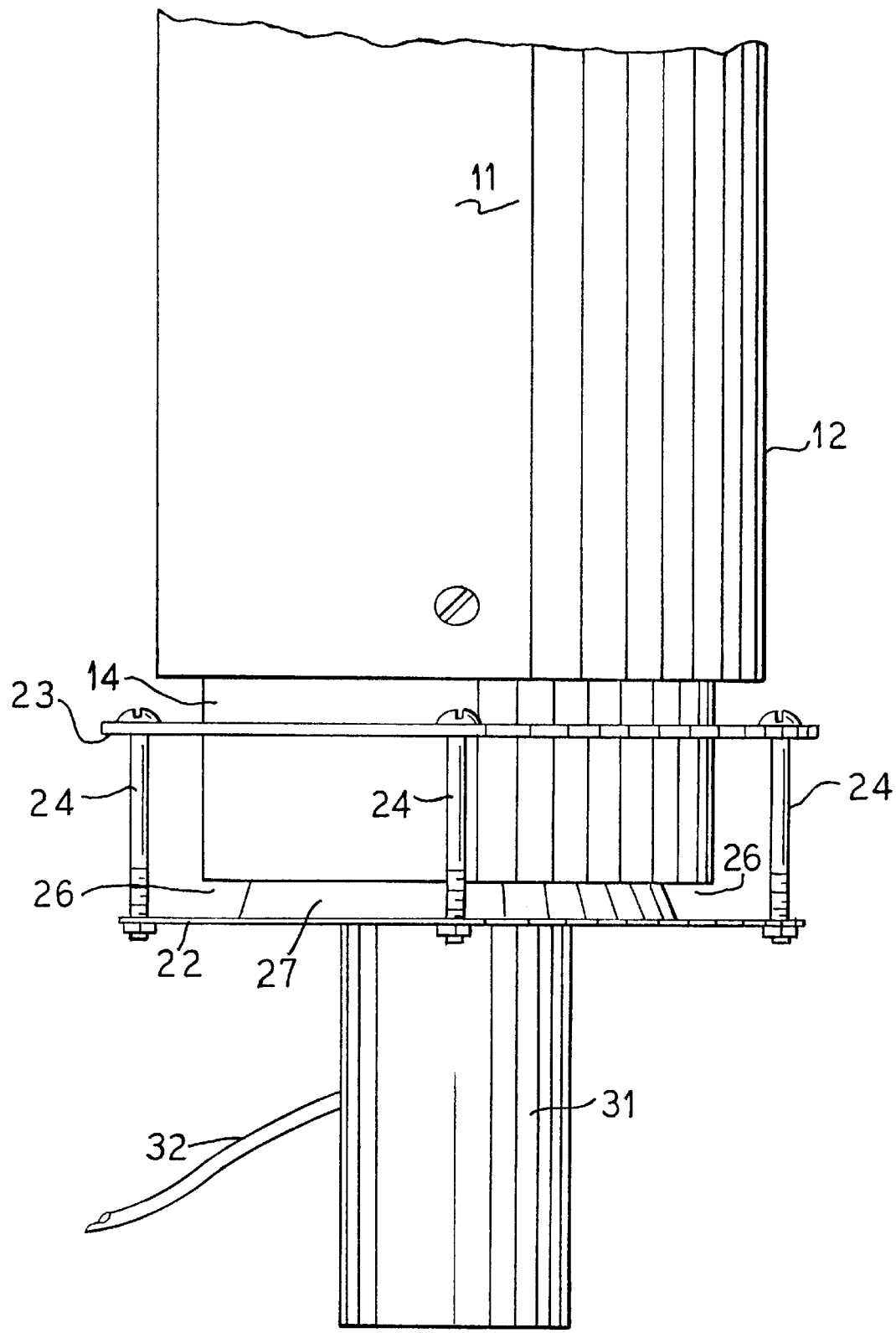
FIG. 2 is a side elevational view of the apparatus of FIG. 1.

Referring to FIGS. 1 and 2, there is seen a presently preferred embodiment 10 of a particulate material dispensing apparatus of this invention. The particulate material being dispensed need have no special characteristics, but a presently preferred and illustrative particulate material comprises fish feed. Apparatus 10 is shown in functional association with a particulate material holding reservoir or hopper 11.

The reservoir 11 is shown fragmentarily, but is conveniently and preferably conventional. Although various such reservoir structures and configurations can be used with the apparatus 10, as those skilled in the art will readily appreciate, the apparatus 10 is believed to be well suited for usage, if desired, with reservoirs of relatively large volumes, such as are proving to be desirable and practical in high density fish culture systems. Usually at its gravitationally lower end region, the reservoir 11 is provided with a bottom discharge mouth 12 having an adjacent neck portion that extends circumferentially about and above the mouth 12. The neck portion can be variously configured.

The apparatus 10 includes a sidewall-defining member 14 which can have various configurations, including, for example, rectangular, square, oval, circular or the like in cross-section, but a presently most preferred configuration (as shown) resembles in side elevation a cylindrical section that has a longitudinal axis (not shown). Relative to the mouth 12, the sidewall-defining member 14 has an upper end 36, a lower end 37 which is longitudinally spaced from the upper end 36, and a cavity 38 therein defined therebetween. When the apparatus 10 is operatively associated with the reservoir 11, the longitudinal axis of the sidewall-defining member 14 is preferably vertically oriented.

The apparatus 10 includes a cover plate 22 which is positioned in longitudinally adjacent but spaced relationship transversely across the lower end 37 of the sidewall-defining member 14. The cover plate 22 can have various configurations, but a present preference is for the cover plate 22 to be generally flat and to have a circular perimeter. The diameter of the cover plate 22 is preferably somewhat larger than the outside diameter of the sleeve 14. Particularly when the apparatus 10 is vertically oriented (as shown in FIG. 1), a small spacing 26 of preferably uniform longitudinal height continuously extends circumferentially around and between the lower end 37 and the adjacent cover plate 22.

The cover plate 22 can be supported in apparatus 10 by any convenient means. Preferably, the cover plate 22 support means is operator-adjustable for purposes of adjusting the longitudinal height of the small spacing 26 for best particulate material dispensing results in a particular use situation with a particular particulate material using the apparatus 10. In apparatus 10, the cover plate 22 is conveniently and preferably supported by, and suspended from, a collar flange 23 that extends integrally and circumferentially around, and radially outwardly from, preferably a mid-region of the sidewall-defining member 14. The flange 23 and the sidewall-defining member 14 can be, for example, integrally formed of plastic or metal, and the cover plate 22 can be, for example, a metal plate, if desired. The cover plate 22 is adjustably suspended from the flange 23 by a plurality of circumferentially spaced, longitudinally extending, elongated bolt and nut assemblies 24 that interconnect aligned and edge-adjacent apertures in each of the flange 23 and the plate 22. The longitudinal size (or vertical height) of the small spacing 26 is adjustable by means of the nut settings of each of the nut and bolt assemblies 24. Optionally, coiled springs (not shown) can circumscribe the shank of each bolt, if desired, thereby to spring bias the spacing 26 into such open configuration.

In place of the sidewall-defining member 14 and the flange 23, various alternative support means for the cover plate 22 can be employed, if desired, as those skilled in the art will appreciate. For example, such an alternative support means can involve flange means or the like (not shown) that is associated with the reservoir 11, the neck 13, the first guide member 16 (illustratively described below), or the mounting means for associating the apparatus 10 with a mouth 12 (illustratively described below).

The apparatus 10 incorporates a first guide member 16. Although preferably and as shown, the first guide member 16 is associated with the upper end 36 of the sidewall-defining member 14, various alternative arrangements can be used, as those skilled in the art will readily appreciate. Here, the guide member 16 preferably extends circumferentially about upper end 36. In apparatus 10, as shown, the first guide member 16 preferably has longitudinally extending outside surface portions 19 that are generally cross-sectionally cylindrically configured. The lower region of outside surface portions 19 are recessed and are adapted to be slidably engaged into inside surface portions of the sidewall-defining member 14 that are adjacent to the upper end 36. The upper region of surface portions 19 have an outside diameter that corresponds to the outside diameter of the sidewall-defining member 14, and the upper region of surface portions 19 extends longitudinally upwards beyond the sidewall-defining member 14. The preferably matching outside diameters of the sidewall-defining member 14 and of the first guide member 116 are preferably sized so that, when slidably and preliminarily so assembled with each other, the sidewall-defining member 14 and the first guide member 16 are slidably insertable through the mouth 12 and into the neck 13 so as to be engagable therewith. Thus, the neck 13 provides the capacity for support of the sidewall-defining member 14 and the first guide member 16 when the apparatus 10 is associated with the reservoir 11.

To fix the position of the assembled sidewall-defining member 14 and first guide member 16 relative to the neck 13, a plurality of screws 43, that are preferably in circumferentially spaced relationship to one another, are extended radially through the wall of the neck 13, then through the wall of the sidewall-defining member 14, and then into the first guide member 16 (as shown in FIG. 1). However, those skilled in the art will readily appreciate that various mounting means can be used to associate the first guide member 16 and the sidewall-defining member 14 with the neck 13.

The first guide member 16 preferably has longitudinally extending inside surface portions 20 that are preferably generally conically configured and spatially oriented so as to have a downwardly converging taper. Preferably, the conically converging surface portions 20 have a longitudinal axis (not shown) that coincides with (that is, is coaxial with) the longitudinal axis of the sidewall-defining member 14. The inside surface portions 20 define a central passageway 17 that extends longitudinally through the first guide member 16. The upper end region of the first guide member 16 defines a relatively large entry mouth 41 for particulate material entry into the first guide member 16 from the interior of the reservoir 11. The cross-sectional area of passageway 17 progressively decreases as the taper of inside wall portions 20 advances downwardly to the lower end region of the first guide member 16 where a lower central aperture 18 is defined in guide member 16 whose cross-sectional area is substantially reduced relative to the cross-sectional area of the entry mouth 41.

The first guide member 16 can be variously constructed metal or plastic. For example, the guide member 16 can be comprised of an inner plastic conically configured sleeve 39 that is associated on its circumferentially extending outside surfaces with a radially outwardly extending outer plastic body 42. Circumferential outside surfaces of sleeve 39 can, for example, be conveniently and preferably bonded by an adhesive or the like (not shown) to circumferentially mating inside surfaces of a body 42. The radially extending, lower surface portions 44 of the body 42 in effect define the effective upper extent of the cavity 38 in the assembled apparatus 10.

A second guide member 27 extends longitudinally and upwardly from association with the upper central region of the cover plate 22. Conveniently, the second guide member 27 is separately formed and is mounted by mechanical fastening means, such as screws or the like (not shown), or by an adhesive or the like (not shown), centrally upon the upper face of the cover plate 22. The second guide member 27, for example, can be comprised of plastic or metal. The second guide member has outside surface portions 29 that progressively and upwardly continuously converge and decline so that, with increasing distance above the cover plate 22, the transverse cross-sectional area of the second guide member 27 generally declines.

Preferably, outside surface portions 29 of the second guide member 27 are conically configured and preferably such outside surface portions 29 have a longitudinal axis (not shown) that is co-axial with the axis of the sidewall-defining member 14 and with the axis of the first guide member 16. A present preference is for the second guide member 27 to be configured in the manner of an inverted funnel when viewed in side elevation such that the large end portion thereof is against the cover plate 22 while the small opposite upper end portion thereof projects preferably axially upwards through the aperture 18 and into the central passageway 17 of the first guide member 16. Preferably, and as shown, for purposes of enhancing downward movement of particulate materials, the upper end portion of the second guide member 27 extends upwardly somewhat beyond the mouth 41. Preferably, the upper end 46 of the second guide member 27 ends in a point like configuration, as shown illustratively in FIG. 1.

The first guide member 16 and the second guide member 27 thus coact to define a toroidally configured gap or spacing 28 in the region of the central aperture 18. The gap 28 preferably has a uniform radial extent. As shown, the upwardly tapered outside walls 29 of the second guide member 27 preferably project above the area of the aperture 18, and preferably extend in the area of the passageway 17. Preferably in such area, the outside walls 29 decline progressively in taper at a different and steeper angle relative to the lateral or transverse direction than the corresponding angle of decline of the outside walls 29 that exists below the area of the aperture 18 and extend into the area of the cavity 38. For similar purposes, preferably, and adjacent to the upper small end region 46 of the second guide member 27, which end region 46 is preferably above the mouth 41, the taper angle of the sidewalls 29 of the second guide member 27 again increases relative to the lateral or transverse direction, and thereby the upper small end region 46 of second guide member 27 terminates preferably in a terminal point-like configuration.

The particular angle of inclination associated with the inside wall portions 20 of the first guide member 16, or with outside wall portions 29 of the second guide member 27, can vary over a wide range, with angles such as qualitatively illustrated in the Figures being exemplary but not limitative.

In apparatus 10, an electrically actuated vibrator assembly 31 is preferably associated with the bottom central region of the cover plate 22. The vibrator assembly 31 is adapted when actuated to vibrate the cover plate 22 and the associated second guide member 27. Conveniently, the vibrator assembly 31 is conventional in structure, and conveniently it is substantially contained in a separate housing which is mounted by adhesive, or by rivets, nut and bolt assemblies, or the like (not shown) against the lower or outer face of the cover plate 22. The vibrator assembly 31 has a conventional power cable 32 so that it can preferably be periodically actuated on and off preferably at measured time intervals by control means (conventional and not shown). Thus, in one presently preferred mode of operation, when the apparatus 10 is dispensing particulate material, the vibrator assembly 31 is periodically actuated by electric timer means which sends an electric current charged through cable 31 for predetermined time intervals. When the vibrator assembly 31 is actuated, the cover plate 22 and the second guide member 27 vibrate in a predetermined manner.

Preferably, the mouth 12, the neck 13, the sidewall-defining member 14, the first guide member 16, and the second guide member 27 are each respectively configured so as to be generally circular in cross-section, but alternative configurations can be used, if desired.

The interrelationship in apparatus 10 between the sidewall-defining member 14, the cover plate 22, the discharge opening or small spacing 26, the first and the second guide member 16 and 27, the vibrator assembly 31, and other related components, is such that (a) the second guide member 27 longitudinally and centrally and preferably axially projects upwardly through each of the lower end 37, the cavity 38, the spacing 28, and at least a portion of the passageway 17, and (b) the outside surface portions 29 of the second guide member 27 are about equally transversely spaced, respectively, from the laterally adjacent inside surface portions 45 of the sidewall-defining member 14, from the small spacing 26, from the aperture 18, and from the inside surface portions 20 of the passageway 17.

When the reservoir 11 is charged with a particulate material, such as, for example, fish feed (not shown), the size of the small spacing 26 is suitably adjusted, and the vibrator assembly 31 is actuated, particulate material from the reservoir 11 moves downwardly along a discharge pathway extending through the neck 13 and into the passageway 17. The particulate material moves downwards through the central passageway 17 along the tapered wall portions 20, through the gap 28, into cavity 38, downwards in cavity 38 along side walls 29, and out through the small spacing 26. Some particulate material is, as desired, transiently retained in and collects in the cavity 38, thereby permitting the cavity 38 to act as a secondary particulate material reservoir. In cavity 38, particulate material moves downwardly during particulate material discharge from apparatus 10.

Because of the component interrelationships, and the characteristics of the slopes of the side walls 20 and 29, during vibration of the second guide member 27 and the cover plate 22 induced by the activation of the vibrator assembly 31, particulate material moves downwardly through the apparatus 10. Clumping, hold up, and bridging are avoided. The toroidal gap 28 and the small circumferential spacing 26 are each always open. However, the size of the small spacing 26 is adjustable (for example, by the means above explained) so that, when the vibrator assembly 31 is not actuated, substantially no particulate material passes through the neck 13 past the gap 28 and out the small spacing 26. When the vibrator assembly 31 is actuated, particulate material passes continuously and uniformly moves through the neck 13 past the gap 28 and out through the small spacing 26. The discharge rate from the small spacing 26 appears to be substantially constant for a given embodiment of apparatus 10 independently of the particulate material fill level in the reservoir 11, and independently of the size of the reservoir 11. The vibrator assembly 31 can be periodically actuated, and, as the reservoir 11 empties, the secondary reservoir provided by the cavity 38 operates to keep the output of particulate material from small spacing 26 uniform during actuation of the vibrator assembly 31. The second guide member 27 aids in avoiding any retention of particulate material over the central region of the cover plate 22 and promotes movement of particulate material through the passageway 17 and through the cavity 38.

Figure 3:
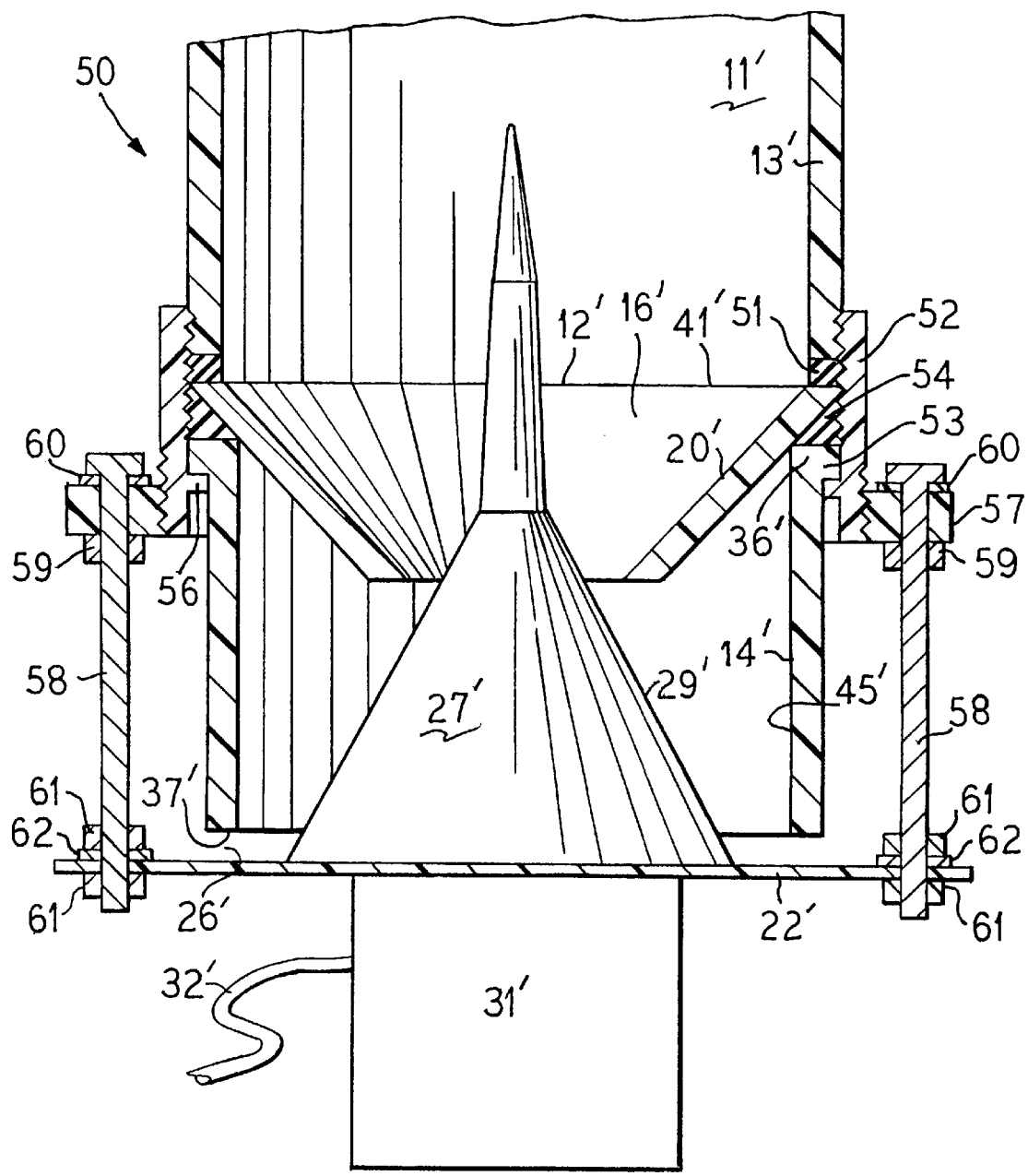
FIG. 3 is a view similar to FIG. 1, but showing another embodiment of such apparatus.

Referring to FIG. 3, there is seen another embodiment 50 of particulate material dispensing apparatus of this invention. Particular components of apparatus 50 which correspond to particular components of apparatus 10 are similarly numbered, but with the addition of prime marks thereto for convenient identification purposes.

In apparatus 50, the first guide member 16' is cross-sectionally circular and is conveniently formed of metal or the like. The diameter of its entry mouth 41' is, as shown, preferably chosen to be about equal to the diameter of the cross-sectionally circular neck 13' of a prechosen hopper or reservoir 11'. For purposes of mounting the apparatus 50 to the reservoir 11', the first guide member 16' has a rim about its entry mouth 41' that is provided with an O-ring-type seating gasket 51 which is adapted to seat against both this rim and the mating bottom edge of the neck 13' existing about the bottom mouth 12' of hopper 11'. To hold the first guide member 16' in engaged relationship with the neck 13', a collar 52 is provided that is circumferentially threaded on its inside surface portions and that is formed of plastic or metal. Collar 52 is adapted to threadably engage mating threads formed circumferentially about the outside of the neck 13' adjacent to the mouth 12', as further explained below.

Just as in the case of the first guide member 16, the guide member 16' can have various conical inclination angles associated with its inside wall portions 20'. The selection of a particular conical inclination angle for a first guide member 16 or 16' is influenced by various factors, such as the characteristics of the particular particulate material that is to be dispensed from a particular reservoir using an apparatus 10 or 50. Since, for purposes of dispensing, the characteristics of a particulate material can vary appreciably from one particular particulate material to another, and since such characteristics even for the same material can sometimes vary because of variables, such as equipment size, rate of dispensing, particulate material moisture content, temperature, humidity, and the like, it is not presently possible to indicate exact conical inclination angles or other dimensions or sizes useful for the optimizing of components to be used in a given apparatus embodiment for the dispensing of a given particulate material in accord with the teachings of this invention.

One may desire, therefore, to provide a series of first guide members 16' which differ from one another in characteristics, such as, for example, the conical inclination angle of their surfaces 20'. Similarly, a series second guide members 27' can be provided which differ from one another in characteristics, such as, for example, the conical inclination angles of the outside wall surfaces 29'. Then through trial with a particular apparatus configuration or component assembly, and with a particular particulate material, a particular first guide member 16' and/or a particular second guide member 27' which produces results that a particular user considers to be optimized can be selected.

The sidewall-defining member 14' here is provided with an integral, outturned, circumferentially-extending flange 53 that is located at its upper end 36'. The sidewall-defining member 14' and the flange 53 each have respective diameters which permit the outside diameter of the flange 53 to be slightly less than the inside diameter of the threaded collar 52, so that the flange 53 fits thereinto, while the inside diameter of the sidewall-defining member 14' permits the upper end 36' to abut against a bottom side surface portion of the first guide member 16'. Another O-ring-type seating gasket 54, which preferably has a triangular configuration in radial cross-section, is provided for location between the adjacent respective surfaces of the first guide member 16', the flange 53, and the collar 52. A lower inside facial portion of the collar 52 is provided with an integral shoulder 56 that is configured to engage the lower side face of the flange 53 when the flange 53 is initially placed in the collar 52. Thus, in the subassembly comprising the gaskets 51 and 54, the first guide member 16', the sidewall-defining member 14', and the threaded collar 52, rotation of the collar 52, when threadably engaged with the neck 13', results in clamping and holding the respective upper end portions of the sidewall-defining member 14' and the first guide member 16' together in the assembled relationship desired in apparatus 50 against the neck 13' at the mouth 12'. The first guide member 16' is clamped and held against the neck 11' between the gasket 51, and the sidewall-defining member 14' is clamped and held against the first guide member 16' with the aid of the gasket 54.

The lower outside circumferential surface portions of the collar 52 are threaded and adapted to be threadably engaged with an internally threaded ring or flange nut 57. When the flange nut 57 is threadably engaged the collar 52, it extends circumferentially around the collar 52. The flange nut 57 is provided with a plurality of longitudinally extending, circumferentially spaced bores (here illustratively four). Each bore receives therethrough an elongated bolt 58. Each bolt 58 adjacent to its upper or head end is provided with a nut 59 and washer 60 to hold it in place against flange nut 57. Each bolt 58 at its lower or tail end extends through an aligned hole adjacent the perimeter of the cover plate 22' and is provided with a pair of nuts 61 and associated washer 62 that are adapted in combination to hold and position the cover plate 22' in a desired adjustable, adjacent, spaced relationship relative to the lower end 37' of the sidewall-defining member 14' so as to provide the desired small spacing 26'.

The second guide member 27' is conveniently connected by a conventional fastening means, such as would involved mechanical means such as nut and bolt means or the like, not shown) or by an adhesive means(not shown) to the central portion of the upper face of the cover plate 22', and conveniently the central portion of the lower face of the cover plate 22' is likewise similarly connected to the housing of an electrically actuated and driven conventional vibrator assembly 31'. Preferably, the fastening means used is reversable so that the assembled components can be disengaged, if desired. Thus, if, for example, an adhesive is used for mounting the second guide member 27' and the vibrator assembly 31' to the cover plate 22', then adhesive can be chosen to be releasable, as by heat or solvent action. Thus, if, for example, one desires to evaluate different configurations or sizes of second guide members 27' or of vibrator assemblies 31' so as to aim at achieving a particular optimized component assembly in apparatus 50 for a particular use situation, the capability of exchanging components is provided.

Conveniently, in the apparatus embodiments 10 and 50, the vibrator assembly 31 or 31' is associated with electrical control means (preferably conventional and not shown) which regulates when said vibrator subassembly is actuated and which also regulates the duration of activation of said vibrator subassembly after being so actuated.

While, as shown in apparatus embodiments 10 and 50, the cover plate 22 or 22' is associated with a vibrator assembly 31 or 31', the vibrator assembly 31 or 31' can be replaced, if desired, by an animal actuatable wand that is associated with, and that depends from, the cover plate. As those skilled in the art will appreciate, shaking of the cover plate, such as is achieved by animal actuation of such an associated animal actuatable wand, produces a shaking movement of the cover plate which is distinctly different from, not suggested by, and not equivalent to, the movement of the cover plate achieved by a vibrator means, such as an electrically actuated and controlled vibrator assembly. This follows because, in the case of an actuated and operating electrical vibrator means, the amount of spatial movement of the associated cover plate is vastly smaller, and the frequency of that movement is cyclical, repetitive, usually regular, and enormously faster (more rapid) than can be achieved by animal actuation and shaking of a wand.

However, in the art of animal husbandry, such as, for example, the aquaculture of fish, on-demand feeding of animals, such as fish, by the animals themselves is common using an animal actuated wand to induce self-actuated dispensing of particulate feed from an associated dispensing apparatus. To utilize such on-demand feeding, the circumstances of husbandry or aquaculture must be suitable and the dispensing apparatus must be operable. In, for example, the case of the feeding apparatus disclosed in Sweeney U.S. Pat. No. 4,565,159 (above discussed), substitution of an animal actuatable wand for the electrically actuated vibrator appears to make the resulting apparatus combination inoperable or unreliable for particulate feed dispensing. This is apparently because, when the wand is installed and in use is shaken by an animal, such as a fish, problems in particulate feed material bridging and clumping tend to occur, and also the particulate material is not uniformly dispensed from one on-demand animal actuation to another.

It is a distinct feature and an advantage of the present invention that, when an apparatus embodiment of this invention is being used for animal feeding, and when the apparatus has its cover plate directly associated with an animal actuatable feeding wand, and the wand is shaken by an animal, the apparatus embodiment generally remains operable for the dispensing of particulate feed with minimal particulate feed bridging and clumping problems. The dispensing of particulate feed, and the amount of feed dispensed from a particular shaking of the wand-equipped inventive apparatus, is related to the vigorousness of the shaking of the wand by an animal, such as a fish. Thus, the rate of feed dispensing from one incidence of wand shaking to another is inherently variable. However, feed dispensing does occur from an apparatus embodiment of the invention so equipped with a wand, and so the wand equipped inventive apparatus is operable for usage in on-demand feeding.

An illustrative embodiment of the inventive apparatus that is equipped with a feeding wand is provided by apparatus embodiment 70 that is described below. However, those skilled in the art will readily appreciate that, if desired, in the apparatus 70 shown in FIG. 4 and described below, the wand 80 can be replaced by a vibrator assembly, such as vibrator 31 or 31', or, if desired, in the apparatus 70, such a vibrator assembly and such a wand 80 can both be associated with a single cover plate 22" or the like so that a combination of a feeding wand 80 and a vibrator assembly 31 can be used.

As those skilled in the art will appreciate, a wand 80 can be variously associated with an electric vibrator means. For example, the wand can be functionally associated with an actuation switch means that is itself associated with either a vibrator assembly 31 or a control means therefor. When the wand is shaken by an animal to a predetermined extent, the vibrator assembly is actuated and the cover plate and the second guide member are vibrated. Preferably, in such an association, electrical control means (conventional, not shown) is employed which regulates the duration of activation of the vibrator subassembly after the vibrator assembly is so actuated. Preferably also, in such an association, electrical control means (conventional, not shown) is employed which deactivates the vibrator assembly for a predetermined time interval after the vibrator assembly is so activated Referring to FIG. 4, there is seen another embodiment 70 of particulate material dispensing apparatus of this invention. The particular components of apparatus 70 which correspond to particular components of apparatus 10 are similarly numbered, but with the addition of double prime marks thereto for convenient identification purposes.

In apparatus 70, the first guide member 16" and the sidewall-defining member 14" are integrally connected and formed as a one-piece molded structure comprised of metal or plastic. The upper end 36" of the sidewall-defining member 14" connects with, and is up-set radially from, the lower or bottom central aperture 18" of the first guide member 16", thereby to better define a secondary reservoir cavity 38". The cross-sectional configuration of the sidewall-defining member 14" is circular, but this cross-sectional configuration decreases with increasing distance above the cover plate 22" because, in apparatus 70, the configuration of the sidewall portions 45" of the sidewall-defining member 14" resembles a conical section in side elevation wherein the longitudinally upper end has a smaller diameter than the opposed end. In the case of the dispensing particulate material which may contain occasionally incorporated therein extraneous material of substantially larder particle size than an average specified upper particle size limit for a given particulate material, such a sidewall configuration for the sidewall-defining member 14', may occasionally tend to cause bridging more often than a sidewalk configuration which is cross-sectional circular and cylindrical in side elevation. If desired, alternative configurations for the inside surfaces 45" of the sidewall-defining member 14" can be employed, such as a cylindrical configuration.

The diameter of the entry mouth 41" of the first guide member 16" is here preferably chosen to be about equal to the diameter of the neck 13" of a prechosen hopper or reservoir 11". For mounting the apparatus 70 to a mouth 12", the rim about the entry mouth 41" is provided with an O-ring-type seating gasket 71 which is adapted to seat against both this rim and the mating bottom edge of the neck 13" existing about the bottom mouth 12" of hopper 11". To hold the first guide member 16" in engaged relationship with the neck 13", an internally threaded collar 72 formed of plastic or metal is provided which is adapted to threadably engage external mating threads formed circumferentially about the outside of the neck 13" adjacent to the mouth 12". A lower inside facial portion of the collar 72 is provided with a circumferentially extending, integrally-formed shoulder 76 that is configured to engage circumferentially a portion of the lower side face of the first guide member 16" adjacent to the entry mouth 41" when the first guide member 16" is initially placed in the collar 72. Thus, when threadably engaged with the neck 13', the collar 72 is adapted to clamp and hold the upper end of the first guide member 16" against the neck 13" in the assembled relationship desired for apparatus 70 at the mouth 12" with the upper end of the first guide member 16" held between the gasket 71 and the shoulder 76.

The second guide member 27" and the cover plate 22" are here in apparatus 70 unitarily formed as a single piece molded assembly comprised of metal or plastic. The upper surface 22A of the cover plate 22" is also beveled and angled downwardly from the bottom or base of the second guide member 27" to the perimeter or outside edge of the cover plate 22", and such outside edge extends circumferentially and radially outwardly beyond the lower end 37" of the sidewall-defining member 14".

The lower outside circumferential surface portions of the collar 72 are threaded and adapted to be threadably engaged with an internally threaded flange nut 77. When the flange nut at 77 is threadably engaged with the collar 72, it extends circumferentially around the collar 72. The flange nut 77 is provided with a plurality of longitudinally extending, circumferentially spaced bores therethough (here preferably four) which each receives therein the shank of a ball headed nut 79. The tail end of an elongated ball-headed bolt 78 is threadably received in each nut 79. A ball socket insert joint 74 is provided at each end for matingly receiving and supporting the ball head of each nut 79 and the ball head of each bolt 78. Each bolt 78 extends loosely through a different one of a plurality of circumferentially spaced oversized holes 75 formed in the cover plate 22". The relationship between each such hole 75 and its associated insert joint 74 is such that each joint 74 after a bolt 78 is extended therethrough is laterally slidably movable within the confines of its associated hole 75. Each bolt 78 is comprised of a transversely flexible (or deflectable), but longitudinally substantially non-extendable, elongated fiber-filled elastomeric plastic. The upper end of an elongated wand 80 is mechanically connected to the cover plate 22" by a screw 81 that is received through the cover plate 22" and that longitudinally threadably engages such wand 80 upper end. The wand 80 thus downwardly depends from the cover plate 22" and so can be positioned for animal mouth access, as in a fish culture pond, or the like, for grasping at will by the mouth of a fish. Thus, in the assembled apparatus 70 configuration shown, when wand 80 is deflected or shaken from its normal relaxed position by an animal, such as a fish, then the cover plate 22" and second guide member 27" shake, resulting in the dispensing of particulate material, such as fish feed, from the reservoir 11".

The apparatus provided by this invention makes possible the achievement of a new and very useful method for dispensing particulate material from the gravitationally bottom mouth of a particulate material dispensing vessel or reservoir. The method involves concurrently carrying out certain steps.

In a first step, one charges particulate material through the top opening, such as mouth 41 in apparatus 10, of a generally vertically oriented zone, such as passageway 17 in apparatus 10. This zone has sides, such as the conically converging side walls 20 of apparatus 10, that are preferably generally configured as a conical section and that downwardly converge and terminate in a bottom opening, such as aperture 18 in first guide member 16 of apparatus 10. These sides have a cross-sectional area at the bottom opening which is substantially smaller than the cross-sectional area at the top opening. Concurrently, one maintains in such zone a generally vertically oriented, centrally positioned guidance member, such as second guidance member 27 of apparatus 10, that upwardly extends through such bottom opening. This guidance member has sides that are preferably generally configured as a conical section and that upwardly converge. Generally and preferably, these sides are substantially equally laterally spaced from adjacent edge portions of such bottom opening. Thus, a toroidally-configured aperture is defined between such edge portions and such guidance member, such as aperture 28 in apparatus 10. The particulate material charged through the top opening passes downwardly through the zone to the toroidally-configured aperture.

In a second step, one positions beneath such bottom opening a generally cross-sectionally circular chamber, such as a chamber or cavity 38 in apparatus 10 and allows particulate material to flow thereinto from the toroidally configured aperture. That chamber has a lower or bottom deck (such as provided by cover plate 22 in apparatus 10). That deck is in downwardly spaced relationship to such toroidally-configured aperture. A circumferentially extending discharge opening is defined between bottom edge regions of the side wall portions of this chamber and the bottom deck. The guidance member extends through this chamber centrally. Thus, the above indicated conically configured outside wall portions of the guidance member continue their downward divergence from such toroidally-configured aperture to such deck. The particulate material passes through such toroidally-configured aperture and moves downwardly in such chamber along the sides of such guidance member towards such discharge opening.

In a third step, one shakes such deck and such guidance member. The relationship between such zone, such toroidally configured aperture, such guidance member body, such discharge opening, and such shaking is such that the particulate material passes from such zone through such aperture, through such chamber and out such discharge opening. Shaking can be variously produced as above indicated, for example, by electrically controlled vibration of the bottom deck, by animal shaking of a wand depending from the bottom deck, or otherwise.

Optionally but preferably in the practice of such method, the guidance member extends upwardly beyond such zone and the guidance member terminates in an upwardly extending, pointed region. Thus, in the region above and in such conically sided zone, as the particulate material moves vertically downwardly, the particulate material is also moved radially outwardly relative to the central region of such bottom opening.

Optionally but preferably in the practice of such method, the guidance member is configured as an inverted funnel, such as second guide member 27 in FIG. 1, when viewed in side elevation. Thus, relative to the transverse or lateral direction, the slope angle of the outside wall of the guidance member is generally greater above the toroidally configured aperture than below it.

The present invention preferably utilizes, along a pathway for particulate material flow, a first zone or chamber with conically converging side walls, and a second gravitationally lower and subsequently entered chamber with preferably cross-sectionally circular side walls. A centrally positioned guide member extends longitudinally and upwardly through the second chamber and through at least a part of the first chamber. The guide member has conically diverging outside walls. The conically-side walled zone and a conically walled guidance-member can be considered to involve a coacting combination of two types of nested, co-axial conical surfaces such that the upper and outermost surface is inverted, relative to the lower and innermost surface.

A present preference is to use the apparatus and method of this invention for the periodic dispensing of fish feed, but many particulate materials can be advantageously dispensed using the present invention, such as grain from grain elevators, plastic granules from plastic reservoirs (as for charging an extruder or the like), bulk particulate material handling, transferring, loading, or dispensing operations (such as gravel, salt, sulfur, flour, sugar, and other various food and nonfood particulate substances).

The invention is further illustrated by the following examples:

EXAMPLE 1

Apparatus 10 like that shown in FIGS. 1 and 2 is associated with a cylindrically configured hopper 11 having an inside diameter of about 7.5 centimeters which approximately corresponds to the inside diameter of the sidewall-defining member 14. The hopper 11 has a volumetric capacity of about 175 cubic centimeters.

The hopper is charged with a manufactured and commercially purchased fish feed composition in pellet form (for instance, High Performance Trout Chow). The pellets mainly have individual dimensions of about 0.5 centimeters in diameter and about 1 centimeter in length. However, if desired, the hopper may be charged with pellets having other observed dimensions, such as, for example, dimensions observed to range in size from as small as about 1.0 millimeter (crumbles) to about 1.25 centimeter in diameter or somewhat larger. The moisture content is preferably relatively low since, with this apparatus and with such a fish feed, continuous feeding can be carried out unattended for extended periods of time. If the moisture content is high, spoilage could occur before complete dispensing of an initially full hopper is achieved.

The toroidal-gap 28 has a radius of about 120 millimeters. The small spacing 26 between the cover plate 22 and the lower end 37 of the sidewall-defining member 14 is here preliminarily adjusted to about 95 millimeters. These dimensional settings allow the feed to be dispensed at a rate in a range extending from about less than 10 pellets to about 1.0 kilogram, the amount dispensed being dependent upon the length of time that the vibrator assembly 31 is actuated. Actuation of the vibrator 31 is here controlled by a timer which is adjusted to cause the vibrator 31 to actuate at timed intervals that are in the range, for example, of as frequently as once every 15 minutes up to once daily (every 24 hours), and then, upon actuation, to operate for a controlled predetermined actuation time interval which can extend, for example for a selected few seconds up to 5 minutes or longer, if desired. Actuation time intervals of less than about 1 minute have been found to be convenient and are typically preferred.

The vibrator 31 is allowed to cycle automatically until the hopper 11 is emptied. Thereafter, the hopper 11 is refilled and recycled. During the cycle period, it is observed that, as the vibrator 31 thus periodically operates for a predetermined time interval, an approximately uniform amount of fish feed is dispensed during each operation of the vibrator 31 regardless of the level of fish feed in the hopper 1. No clumping or bridging of fish feed is observed.

EXAMPLE 2

Apparatus like that shown in FIGS. 1 and 2 and as described in Example 1 is employed except that the vibrator assembly 31 is associated with a depending wand similar to wand 80 in apparatus 70. The wand extends down into water where fish are being cultured. When the wand is shaken by being grasped in the mouth of a fish in the water, the vibrator 31 is actuated (switched on), and feed is dispensed from the apparatus for a predetermined time interval so that on-demand feeding is carried out. After being so actuated, the vibrator is deactivated (that is, is disarmed and made inoperable by further wand shaking) for a predetermined time interval, and then is automatically reactivated (that is, is re-armed and made operable and responsive to further wand shaking), thereby to provide for a more judicious use of the fish feed being dispensed than results when the vibrator is and remains continuously actuatable by wand shaking by the fish.

The vibrator 31 is thus allowed to be operated periodically until the hopper 11 is emptied. Thereafter, the hopper 11 is refilled and allowed to operate periodically by wand activation. It is observed that, as the vibrator 31 thus actuated and periodically operated for a predetermined time interval, an approximately uniform amount of fish feed is dispensed during each operation of the vibrator 31 regardless of the level of fish feed in the hopper 11. No clumping or bridging of fish feed is observed.

EXAMPLE 3

A circular fish tank in which fish are being cultured and which is about 20 feet in diameter (about 6.07 meters) is provided above and adjacent to its circumferential periphery with four fish feeders that are spaced from one another at about 90 degree intervals. One of these feeders comprises apparatus as described in Example 1 (above); the other three feeders each comprises apparatus as described in Example 2 (above). Each feeder is operated in the respective manner described above in Example 1 and Example 2.

It is observed that the fish in the tank are well fed and develop uniformly. Water quality problems are controlled and minimal. The installation is well suited for high density fish culture.

EXAMPLE 4

When in place of the apparatus above described, respectively, in Examples 1 and 2, corresponding apparatus having larger dimensions is utilized, it is observed that, because of the increase in dimensions, such as the increase in the lineal circumferential distance of the small spacing 26, it is more difficult to control the feed dispensed during each operation of the vibrator 31. It is therefore presently preferred to conduct high density fish aquaculture in a tank, such in as a tank sized as described in Example 3, using a plurality of apparatus embodiments sized as described in Examples 1 and 2, preferably four as described in Example 3, rather than using only one or a fewer number of larger sized apparatus units for dispensing fish feed to a fish population.

However, it is observed that, even with the larger sized apparatus embodiments, as the vibrator 31 is actuated for a constant time interval at preset periodic times, an approximately uniform average amount of fish feed (over time based on total vibrator actuations occurring during the time period required for the hopper 11 to empty from an initial full state) is dispensed regardless of the level of fish feed in the hopper 11. No clumping or bridging of fish feed is observed.

The foregoing description is exemplary only and is not limitative. It is understood that variations of the present invention are possible within the spirit and scope of the following claims.

What is claimed is:

1. Particulate material dispensing apparatus for a gravitationally bottom discharge mouth of a particulate material dispensing vessel, said apparatus comprising in combination:

a sidewall-defining member having sidewalls that define an open upper end, an open lower end which is longitudinally spaced from said upper end, and a cavity therebetween;

a first guide member at said upper end, said first guide member defining a top opening, a lower aperture which is longitudinally spaced from said top opening, and a passageway therebetween, said passageway having side surface portions which progressively and downwardly continuously convergingly taper;

means for connecting said sidewall-defining member with said first guide member;

means for mounting said sidewall-defining member and said first guide member to portions of said vessel adjacent said discharge mouth thereof with said top opening and said upper end over said discharge mouth;

a cover plate positioned in longitudinally adjacent but spaced relationship transversely across said lower end, thereby to define with said lower end a discharge opening that extends peripherally about said lower end over said cover plate;

means for so positioning said cover plate relative to said sidewall-defining member;

a second guide member that longitudinally and upwardly projects from said cover plate centrally through said cavity and said lower aperture, said second guide member having outside surface portions which progressively and upwardly continuously convergingly taper, and including means joining said second guide member with said cover plate;

means for shaking said cover plate;

whereby, when said shaking means is actuated, a particulate material in said passageway is enabled to pass downwardly and progressively through said passageway, said lower aperture, and said cavity, over said outside surface portions, and out through said discharge opening.

2. The apparatus of claim 1 wherein said sidewall-defining member, said first guide member, said second guide member, and said cover plate are each generally cross-sectionally circular, and a toroidally-configured opening is defined between said lower aperture and said second guide member.

3. The apparatus of claim 2 wherein said sidewalls are generally cylindrical, said cover plate has a rounded perimeter which extends radially outwardly beyond said sidewalls, and said passageway side surface portions and said second guide member outside surface portions are each conical, said discharge opening extends circumferentially and uniformly about said lower end, and a toroidally-configured opening is defined between said lower aperture and said second guide member.

4. The apparatus of claim 1 wherein said passageway said cavity, and said second guide member outside surface portions are generally coaxial and said second guide member extends from said cover plate through said cavity, said lower aperture and said passageway.

5. The apparatus of claim 1 wherein said means for mounting interconnects said apparatus with said particulate material dispensing vessel so that said apparatus and said vessel are in combination.

6. The apparatus of claim 1 wherein said sidewall-defining member and said first guide member are each separately preformed.

7. The apparatus of claim 1 wherein said means for mounting comprises in combination:

(a) collar flange means that is generally integral with said sidewall-defining member and that extends radially outwardly therefrom, and (b) a plurality of circumferentially spaced, elongated nut and bolt assemblies that each extends longitudinally between and interconnects said collar flange means with peripherally-adjacent portions of said cover plate.

8. The apparatus of claim 1 wherein said means for mounting comprises in combination:

(a) flange means that is generally radially adjacent to, and extends radially outwardly relative to, a portion of said first guide means; and (b) a plurality of circumferentially spaced, elongated nut and bolt assemblies that each extends longitudinally between and interconnects said flange means with said cover plate.

9. The apparatus of claim 1 wherein said second guide member outside surface portions have a configuration in side elevation that resembles that of an inverted funnel, and wherein the conical inclination angle of said second guide member outside surface portions relative to a longitudinal axis is reduced above said lower aperture and in said passageway relative to said angle below said lower aperture and in said cavity.

10. The apparatus of claim 9 wherein the upper end of said second guide member projects above and beyond said first guide member.

11. The apparatus of claim 9 wherein said upper end of said second guide member is generally pointed.

12. The apparatus of claim 1 wherein said cover plate and said second guide member are unitarily formed.

13. The apparatus of claim 1 wherein said means for shaking comprises an electrically actuated vibrator subassembly that is connected to said cover plate whereby, when said vibrator subassembly is actuated, said cover plate and said second guide member are vibrated.

14. The apparatus of claim 13 wherein said vibrator subassembly further includes electrical control means which regulates when said vibrator subassembly is actuated and which also regulates the duration of activation of said vibrator subassembly after being so actuated.

15. The apparatus of claim 13 wherein said vibrator subassembly further includes electrical control means which:

includes a functionally associated animal actuatable wand member for actuating said vibrator subassembly when said wand member is shaken to a predetermined extent, and regulates the duration of activation of said vibrator subassembly after said vibrator assembly is so actuated.

16. The apparatus of claim 15 wherein said electrical control means further includes means for deactivating said vibrator assembly for a predetermined time interval after said vibrator assembly is so activated.

17. The apparatus of claim 1 wherein said means for shaking comprises an animal actuatable wand member that is connected to and hangs from said cover plate whereby, when said wand member is actuated, said cover plate and said second guide member are shaken.

18. Particulate material dispensing apparatus for a gravitationally bottom discharge mouth of a particulate material dispensing vessel, said apparatus comprising in combination:

- a sidewall-defining member having sidewalls that define an open upper end, an open lower end which is longitudinally spaced from said upper end, and a cavity therebetween;
- a first guide member at said upper end, said first guide member defining a top opening, a lower aperture which is longitudinally spaced from said top opening, and a passageway therebetween, said passageway having side surface portions which progressively and downwardly continuously convergingly taper;
- said sidewall-defining member and said first guide member each being separately preformed, portions of said sidewall-defining member slidably associate with each other, thereby resulting in a subcombination, and portions of said subcombination slidably associate with said vessel at said bottom discharge mouth, and a plurality of circumferentially spaced screw means extend generally radially through said vessel and said sidewall-defining member and into said first guide member, thereby mounting said sidewall-defining member and said first guide member to said discharge mouth;
- a cover plate positioned in longitudinally adjacent but spaced relationship transversely across said lower end, thereby to define with said lower end a discharge opening that extends peripherally about said lower end over said cover plate;
- means for so positioning said cover plate relative to said sidewall-defining member;
- a second guide member that longitudinally and upwardly projects from said cover plate centrally through said cavity and said lower aperture, said second guide member having outside surface portions which progressively and upwardly continuously convergingly taper, and including means joining said second guide member with said cover plate,
- means for shaking said cover plate, whereby, when said shaking means is actuated, a particulate material in said passageway is enabled to pass downwardly and progressively through said passageway said lower aperture, and said cavity, over said outside surface portions, and out through said discharge opening.

19. Particulate material dispensing apparatus for a gravitationally bottom discharge mouth of a particulate material dispensing vessel, said apparatus comprising in combination:

- a sidewall-defining member having sidewalls that define an open upper end, an open lower end which is longitudinally spaced from said upper end, and a cavity therebetween:
- a first guide member at said upper ends said first guide member defining a top opening, a lower aperture which is longitudinally spaced from said top opening, and a passageway therebetween, said passageway having side surface portions which progressively and downwardly continuously convergingly taper,
- said sidewall-defining member and said first guide member being unitarily formed;
- means for mounting said sidewall-defining member and said first guide member to portions of said vessel adjacent said discharge mouth thereof with said top opening and said upper end over said discharge mouth,
- a cover plate positioned in longitudinally adjacent but spaced relationship transversely across said lower end, thereby to define with said lower end a discharge opening that extends peripherally about said lower end over said cover plate;
- means for so positioning said cover plate relative to said sidewall-defining member;
- second guide member that longitudinally and upwardly projects from said cover plate centrally through said cavity and said lower aperture, said second guide member having outside surface portions which progressively and upwardly continuously convergingly taper, and including means joining said second guide member with said cover plate;
- means for shaking said cover plate, whereby, when said shaking means is actuated, a particulate material in said passageway is enabled to pass downwardly and progressively through said passageway, said lower aperture, and said cavity, over said outside surface portions, and out through said discharge opening.

20. A particulate material dispensing apparatus for the gravitationally bottom discharge mouth of a particulate material dispensing vessel, said apparatus comprising in combination:

- a generally cylindrical member having an open upper end, an open lower end, and a cavity therebetween;
- a first guide member associated with, and extending circumferentially about, said upper end, said first guide member having a top opening, a bottom opening that is substantially smaller than said top opening, and conically tapered inside wall portions extending therebetween that define a passageway;
- means for connecting said cylindrical member with said first guide member;
- means for mounting said cylindrical member and said first guide member to portions of said vessel adjacent said discharge mouth thereof with said top opening and said upper end over said discharge mouth,
- a generally flattened, generally circular cover plate positioned in longitudinally adjacent but spaced relationship transversely across said lower end, said cover plate having a diameter that is larger than the diameter of said cylindrical member, thereby to define a particulate material discharge opening between said cover plate and said cylindrical member that extends circumferentially about said lower end, and including means for supporting said cover plate in said adjacent but spaced relationship;
- a second guide member that upwardly projects from the central region of said cover plate, that has generally conically configured outside walls which are oriented so that the transverse cross-sectional area of said second guide member declines with increasing distance above said cover plate, and including means joining said second guide member with said cover plate;
- means for shaking associated with said cover plate for vibrating said cover plate and said body;
- the interrelationship between said discharge opening, said second guide member, said first guide member, and said shaking means being such that
- said second guide member longitudinally projects upwardly through each of said lower end, said first cavity, said bottom opening, and at least a portion of said passageway, and
- said outside surface portions are about equally transversely spaced from respective laterally adjacent portions of said cylindrical member, said bottom opening, and said conically tapered inside wall portions;

whereby a particulate material in said passageway is enabled to pass downwardly and progressively through said cavity, said bottom opening, and said passageway, over said outside surface portions, and out through said discharge opening when said shaking means is actuated.

21. The apparatus of claim 20 wherein said means for mounting interconnects said apparatus with said particulate material dispensing vessel so that said apparatus and said vessel are in combination.

22. The apparatus of claim 20 wherein said means for supporting comprises a plurality of circumferentially spaced, elongated bolt and adjustable nut means extending between said cover plate and radially outwardly extending flange means associated with said apparatus.

23. The apparatus of claim 22 wherein said flange leans is associated with said cylindrical member.

24. The apparatus of claim 23 wherein said second guide member has an upper end portion that extends above and beyond said first guide member, and wherein said upper end portion terminates in a pointed configuration.

25. The apparatus of claim 22 wherein said flange means is associated with said means for mounting.

26. The apparatus of claim 20 wherein said means for shaking comprises an electrically actuated vibrator subassembly that is connected to said cover plate whereby, when said vibrator subassembly is actuated, said cover plate and said second guide member are vibrated.

27. The apparatus of claim 20 wherein said means for shaking comprises an animal actuatable wand member supported by and depending from said cover plate whereby, when said wand member is actuated, said cover plate and said second guide member are shaken.

28. The apparatus of claim 20 wherein said second guide member extends axially upwards from said cover plate through said cavity, said lower aperture and said passageway, and a torroidal-type opening is defined between said lower aperture and said second guide member.

29. The apparatus of claim 28 wherein said outside walls of said second guide member have a configuration in side elevation that resembles that of an inverted funnel, and wherein the conical inclination angle of said outside walls relative to a longitudinal axis is reduced above said lower aperture and in said passageway relative to said inclination angle below said lower aperture and in said cavity.

30. A particulate material dispensing apparatus for the gravitationally bottom discharge mouth of a particulate material dispensing vessel, said apparatus comprising in combination:

(A) a generally cylindrical member having an open upper end, an open lower end, and a cavity therebetween;

(B) a generally flattened, generally circular cover plate positioned in longitudinally adjacent but spaced relationship transversely across said lower end, thereby to define a particulate material discharge opening between said cover plate and said cylindrical member;

(C) means for connecting said cover plate with said cylindrical member;

(D) a first guide member at said upper end, said first guide member having a top opening, a bottom opening that is substantially smaller than said top opening, and conically tapered inside wall portions extending therebetween that define a passageway;

(E) interconnecting means for connecting said first guide member with said cylindrical member and for mounting said cylindrical member and said first guide member to portions of said vessel adjacent said discharge mouth thereof with said top opening and said upper end being over said discharge mouth;

(F) a second guide member that upwardly projects centrally from said cover plate, that has generally conically configured outside wall portions which are oriented so that the transverse cross-sectional area of said second guide member declines with increasing distance above said cover plate, and that includes means joining said second guide member with said cover plate;

(G) electrically actuatable vibrator means associated with said cover plate for vibrating said cover plate and said second guide member;

(H) the interrelationship between said discharge opening, said second guide member, said first guide member, and said vibrator means being such that said second guide member longitudinally projects upwardly through each of said lower end, said first cavity, said bottom opening, and at least a portion of said passageway, and said outside wall portions are about equally transversely spaced from respective laterally adjacent portions of said cylindrical member, said bottom opening, and said conically tapered inside wall portions;

whereby a particulate material in said passageway is enabled to pass downwardly and progressively through said cavity, said bottom opening, and said passageway, over said outside wall portions, and out through said discharge opening when said vibrator means is actuated.

31. A method for dispensing particulate material from a gravitationally bottom mouth of a particulate material dispensing vessel, said method comprising the steps of concurrently (A) gravitationally charging particulate material through a generally vertically oriented zone having sides that are generally configured as a downwardly converging conical section that terminates in a bottom opening whose cross-sectional area is substantially smaller than the cross-sectional area of said top opening while maintaining in said zone a generally vertically oriented, centrally positioned body that upwardly extends through said bottom opening, said body having sides that are generally configured as an upwardly converging conical section, whereby a toroidally-configured aperture exists between said bottom opening and said body sides through which said particulate material passes;

(B) flowing said particulate material from said toroidally-configured aperture downwardly through a generally cross-sectionally circular cavity located in downwardly spaced relationship to said toroidally-configured aperture to a bottom deck in said cavity, there being a circumferentially extending discharge opening defined between a bottom periphery of said cavity and said deck, while maintaining in said cavity a centrally located, downwardly extending continuation of said body so that said sides of said body downwardly diverge and extend in said chamber from said toroidally-configured aperture to said deck, whereby said particulate material moves to said discharge opening; and (C) shaking said deck and said body, the relationship between said zone, said toroidally-configured aperture, said body, said discharge opening, and said shaking being such that during said shaking, said particulate material passes through said discharge opening.

* * * * *